United States Patent [19]
Kominami et al.

[11] 3,869,500
[45] Mar. 4, 1975

[54] PROCESS FOR THE PRODUCTION OF UNSATURATED ALIPHATIC NITRILES

[75] Inventors: Naoya Kominami, Tokyo; Hitoshi Nakajima, Ageo; Seiji Miyata; Takeo Kimura, both of Tokyo; Masazumi Chono, Saitama; Tokio Sakurai, Tokyo, all of Japan

[73] Assignee: Asahi Kasei Kogyo Kabushiki Kaisha, Osaka, Japan

[22] Filed: Aug. 21, 1973

[21] Appl. No.: 385,003

Related U.S. Application Data

[63] Continuation of Ser. No. 206,541, Dec. 9, 1971, abandoned, which is a continuation of Ser. No. 807,976, March 17, 1969, abandoned.

[30] Foreign Application Priority Data

Mar. 23, 1968 Japan.............................. 43-18622

[52] U.S. Cl...... 260/465.3, 260/465.7, 260/465.8 R
[51] Int. Cl..................... C07c 121/04, C07c 121/02
[58] Field of Search........ 260/465.3, 465.7, 465.8 R

[56] References Cited
UNITED STATES PATENTS

| | | | |
|---|---|---|---|
| 3,282,981 | 11/1966 | Davis............................... | 260/465.3 |
| 3,424,782 | 1/1969 | Ohmori et al.................... | 260/465.3 |
| 3,426,061 | 2/1969 | Gruber............................. | 260/465.3 |
| 3,465,028 | 9/1969 | Kominami et al................ | 260/465.3 |
| 3,553,246 | 1/1971 | Kominami et al................ | 260/465.3 |
| 3,574,701 | 4/1971 | Kominami et al................ | 260/465.3 |
| 3,584,029 | 6/1971 | Kominami et al................ | 260/465.3 |

*Primary Examiner*—Joseph P. Brust
*Attorney, Agent, or Firm*—Burgess, Dinklage & Sprung

[57] ABSTRACT

Process for the production of unsaturated aliphatic nitriles selected from acrylonitrile, methacrylonitrile, crotononitrile, alpha-ethylacrylonitrile, beta-ethylacrylonitrile, alpha, beta-dimethylacrylonitrile, beta, beta-dimethylacrylonitrile, chloroacrylonitrile and fumaronitrile, which comprises contacting a gas mixture consisting essentially of an olefinic compound selected from ethylene, propylene, normal butylene, isobutylene and vinyl chloride, hydrogen cyanide and oxygen or a molecular oxygen-containing gas at a temperature of 100° to 500°C with a catalyst selected from palladium metal, chloride, bromide, iodide, cyanide, thiocyanide, oxide, hydroxide, sulfide, sulfate, nitrate, phosphate, hypochlorite, chlorite, chlorate, bromate, iodate, formate, acetate, monochloroacetate and oxalate which has been treated with a reducing sulfur compound at a temperature of from −10° to 1,200°C. The treatment with a reducing sulfur compound remarkably improves the catalytic life. Hydrogen sulfide and sulfur dioxide are especially preferred as reducing sulfur compound.

14 Claims, No Drawings

PROCESS FOR THE PRODUCTION OF UNSATURATED ALIPHATIC NITRILES

This is a continuation, of application Ser. No. 206,541, filed Dec. 9, 1971, now abandoned, which in turn was a continuation of Ser. No. 807,976, filed Mar. 17, 1969, now abandoned.

This invention relates to a process for producing unsaturated nitriles by subjecting a gaseous mixture of an unsaturated organic compound, hydrogen cyanide and oxygen to a gas phase catalytic reaction in the presence of a catalyst comprising palladium metal or a compound thereof which has been treated with a reducing sulfur compound.

In our British Pat. No. 1,084,599 there is described a process for producing unsaturated aliphatic nitriles directly in one stage by subjecting a gaseous mixture of olefinic hydrocarbon, hydrogen cyanide and oxygen to a gas phase catalytic reaction.

Other processes for producing unsaturated aliphatic nitriles described in our British Pat. Nos. 1,127,355 and 1,139,398 comprise subjecting a gaseous mixture containing olefinic hydrocarbon, hydrogen cyanide and oxygen to a catalytic reaction in the presence of hydrogen halide, halogenated aliphatic nitrile, or a gaseous mixture thereof or together with unsaturated aliphatic nitrile.

It has been found that when the catalyst comprising palladium metal or a compound thereof is used after treatment with a reducing sulfur compound the catalytic life is remarkably improved.

Examples of the olefinic compounds according to the present invention include ethylene, propylene, normal butylene, isobutylene and vinyl chloride.

The products of the unsaturated aliphatic nitriles are: acrylonitrile from ethylene; methacrylonitrile and crotononitrile from propylene; alpha-ethylacrylonitrile, beta-ethylacrylonitrile and alpha, beta-dimethylacrylonitrile from normal butylene; beta, beta-dimethylacrylonitrile from isobutylene; and chloroacrylonitrile, fumaronitrile and acrylonitrile from vinyl chloride.

The catalysts according to the present invention include palladium metal and palladium compounds. Although it is desirable to incorporate at least one compound of lithium, sodium, potassium, rubidium, cesium, magnesium, calcium, strontium, barium, zinc, cadmium, lanthanum, cerium, thorium, uranium, indium, antimony, bismuth, chromium, molybdenum, tungsten, iron, cobalt, nickel, thallium manganese, tin, lead, vanadium, tellurium, silver or one metal or one compound of copper, platinum or ruthenium into the catalyst mentioned above, it is not essential.

The palladium compounds and the compounds of lithium, sodium, potassium, rubidium, cesium, magnesium, calcium, strontium, barium, zinc, cadmium, lanthanum, cerium, thorium, uranium, indium, antimony, bismuth, chromium, molybdenum, tungsten, iron, cobalt, nickel, thallium, manganese, tin, lead, vanadium, tellurium, silver, copper, platinum and ruthenium mentioned above include chlorides, bromides, iodides, cyanides, thiocyanides, oxides, hydroxides, sulfides, sulfates, nitrates, phosphates, selenites, hypochlorites, chlorites, chlorates, bromates, iodates, organic acid salts such as formates, acetates, monochloroacetates, citrates and oxylates.

The use of a carrier is not essential but is preferable. The carrier may be any one that can be usually employed as carrier. Examples of carrier are silica, alumina, silica-alumina, alumina-boria, alumina spinel, active carbon, diatomaceous earth, pumice, molecular sieves and silicates. The amount of palladium metal or a compound of palladium in the catalyst supported on a carrier is preferably in the range of 0.02 to 20 percent by weight. When a compound of lithium or other metals above-described is used, the atomic ratio of palladium to lithium or other metals is preferably in the range of 1 : 100 – 1/1,000.

The catalyst for use in the process of this invention may be prepared, for example, (a) by supporting on a carrier the whole components of catalyst by any of the conventional methods such as immersing method, mixing method, coprecipitating method, co-gelling method or heating method and treating the resultant mixture with a reducing sulfur compound or (b) by supporting on a carrier a part of the components of catalyst by said method, treating the resultant mixture with a reducing sulfur compound and supporting the remaining part of the component of catalyst.

The reducing sulfur compounds may be either liquid or gas. When the reducing sulfur compound is gas, the concentration is preferably in the range of 1 to 100 percent by volume. The gaseous reducing sulfur compounds may contain a small amount of a reducing gas such as hydrogen or carbon monoxide. When the reducing sulfur compound is liquid, the concentration is preferably in the range of 0.001 to 100 percent by weight. Solvents such as water, aliphatic hydrocarbons such as hexane, aromatic hydrocarbon such as toluene, ketones, ethers and carboxylic acids may be used.

The temperature at which the reducing sulfur compound treatment is to be conducted is preferably in the range of $-10°$ to $1,200°C$. When hydrogen sulfide or sulfur dioxide gas is used, the temperature is preferably in the range of $200°$ to $1,000°C$. The reducing sulfur compound treatment is carried out at atmospheric pressure but may also be effected under pressure or under reduced pressure.

Exemplary reducing sulfur compounds of the present invention include hydrogen sulfide, sulfur dioxide, ammonium thiocyanate, mercaptans such as methyl-, ethyl-, normal propyl-, secondary propyl-, normal butyl-, isobutyl-, secondary butyl-, tertiary butyl-, normal amyl-, normal hexyl-, normal heptyl-, normal octyl- or normal nonyl-mercaptan, sulfides such as methyl-, ethyl-, normal propyl-, normal butyl-, normal amyl-, normal hexyl- or phenyl-sulfide, disulfides such as methyl-, ethyl- or phenyl-disulfides and thiophenes such as thiophene, 2-methyl- or 3-methyl thiophene. Especially hydrogen sulfide and sulfur dioxide are preferred.

The reaction of the present invention may be effectively carried out in the presence of one hydrogen halide such as hydrogen chloride, hydrogen bromide or hydrogen iodide but the presence of the hydrogen halide is not essential.

Also the reaction may be effectively carried out in the presence of a halogenated aliphatic nitriles such as beta-halogenated propionitrile, beta-halogenated isobutyronitrile, beta-halogenated butyronitrile, 1-halo-2-cyanobutane, 1-cyano-2-halobutane, 2-halo-3-cyanobutane and beta-methyl-beta-halobutyronitrile. As halogens contained in these compounds, chlorine, bromine and iodine are preferable. More specifically, when using ethylene or vinyl chloride as an olefinic hydrocarbon, beta-halogenated propionitrile is preferred, and if propylene is used, beta-halogenated isobutyronitrile and beta-halogenated butyronitrile are preferable. When using n-butylene, 1-halo-2-cyanobutane, 1-cyano-2-halobutane and 2-halo-3-cyanobutane are preferable, and if isobutylene is used, beta-methyl-beta-halobutyronitrile is preferred.

The volume ratio of the olefinic hydrocarbon to hydrogen cyanide in a starting gas mixture is preferably in the range of 1:20–1/50 and the volume ratio of oxygen to hydrogen cyanide is preferably in the range of 80–1/20:1. When a hydrogen halide is employed, the volume ratio of hydrogen cyanide to the hydrogen halide is preferably in the range of 1:20–1/100. When a halogenated aliphatic nitrile is employed, the volume ratio of hydrogen cyanide to the halogenated aliphatic nitrile is preferably in the range of 1:20–1/100.

In practicing the process of the present invention, the presence of an inert gas or a relatively low reactive gas is not necessarily required but is not objectionable. The inert or relatively low reactive gas which may be present in a starting gas mixture includes helium, nitrogen, carbon dioxide, carbon monoxide, steam, methane, ethane, propane, butane, ethylbenzene and aliphatic nitriles such as acrylonitrile, propionitrile, acetonitrile, methacrylonitrile and crotononitrile.

In practicing the present invention, a small amount of hydrogen sulfide may be present in the starting gas mixture but this is not essential.

The temperature adopted in the present invention is generally from 100° to 500°C and preferably from 200° to 450°C.

The pressure in the present invention may be atmospheric. The reaction may also be effected under superatmospheric pressure.

The space velocity is preferably in the range of 20 $hr^{-1}$, to 20,000 $hr^{-1}$.

This invention will be illustrated by the following examples which are in no way limiting upon the scope thereof. Percentages are by mole unless expressly stated to the contrary.

EXAMPLE 1

An aqueous hydrochloric acid solution containing 0.1 gram-mole of palladium chloride and 0.1 gram-mole of zinc chloride was mixed with 1 L. of an aqueous silica sol solution containing 20 percent by weight of $SiO_2$ and the mixture was evaporated to dryness in a rotary evaporator. The resultant mixture was treated with hydrogen sulfide gas at 400°C. for 20 hours. Furthermore 0.1 gram-mole of cesium chloride per 1 L. of silica sol was supported on the resultant mixture. 5 ml. of this catalyst was mixed with 5 ml. of quartz sand and filled into a reaction tube of heat-resistance glass of 8 mm. inside diameter. The reaction tube was maintained at 360°C. and a gas mixture consisting of ethylene, hydrogen cyanide, oxygen, hydrogen chloride and nitrogen at a volume ratio of 3:1:2:1:3 was introduced at a space velocity of 300 $hr^{-1}$. The yield of acrylonitrile based on the introduced hydrogen cyanide was 90.1 percent both over 5 days and over 60 days after the starting of reaction.

COMPARATIVE EXAMPLE 1

An aqueous hydrochloric acid solution containing 0.1 gram-mole of palladium chloride, 0.1 gram-mole of zinc chloride and 0.1 gram-mole of cesium chloride was mixed with 1 l. of an aqueous silica sol solution containing 20 percent by weight of $SiO_2$ and the mixture was evaporated to dryness in a rotary evaporator. Using 5 ml. of this catalyst, the reaction was carried out in the same manner as in Example 1. The yield of acrylonitrile based on the introduced hydrogen cyanide was 87.0 percent over 5 days after the starting of reaction and 45.1 percent over 60 days after the starting of reaction.

EXAMPLE 2

5 ml. of the same catalyst as in Example 1 was mixed with 5 ml. of quartz sand and filled into the same reaction tube as in Example 1. The reaction tube was maintained at 380°C. and a gas mixture consisting of normal butylene, hydrogen cyanide, oxygen, hydrogen chloride and nitrogen at a volume ratio of 2:1:1:1:5 was introduced at a space velocity of 100 $hr^{-1}$. The yields of alpha, beta-dimethylacrylonitrile and ethylacrylonitrile based on the introduced hydrogen cyanide were 27.0 and 53.0 percent respectively, both over 5 days and 30 days after the starting of reaction.

COMPARATIVE EXAMPLE 2

The reaction was carried out in the same manner as in Example 1 using the same catalyst as in Comparative Example 1. The yields of alpha, beta-dimethylacrylonitrile and ethylacrylonitrile based on the introduced hydrogen cyanide were 25.5 and 52.3 percent respectively over 5 days after the starting of reaction and 18.0 and 37.1 percent respectively, over 30 days after the starting of reaction.

EXAMPLE 3

2 ml. of the same catalyst as in Example 1 was mixed with 2 ml. of quartz sand and filled into the same reaction tube as in Example 1. The reaction tube was maintained at 330°C. and a gas mixture consisting of vinyl chloride, hydrogen cyanide, oxygen, hydrogen chloride and nitrogen was introduced at a volume ratio of 3:1:1:1:4 was introduced at a space velocity of 500 $hr^{-1}$. The yields of chloroacrylonitrile, fumaronitrile and acrylonitrile based on the introduced hydrogen cyanide were 20.2, 17.8 and 15.3 percent respectively, over 5 days after the starting of reaction and the same yields were maintained over 15 days after the starting of reaction.

COMPARATIVE EXAMPLE 3

Using the same catalyst as in Comparative Example 1, the reaction was carried out in the same manner as in Example 3. The yields of chloroacrylonitrile, fumaronitrile and acrylonitrile based on the introduced hydrogen cyanide were 20.0, 17.8 and 15.0 percent respectively, over 5 days after the starting of reaction, and 15.8, 15.0 and 13.5 percent respectively, over 15 days after the starting of reaction.

EXAMPLE 4

0.1 gram-mole of palladium chloride, 0.1 gram-mole of cadmium chloride and 0.1 gram-mole of cesium chloride were supported on 1 l. of silica gel and the resultant mixture was treated at 400°C. for 20 hours with a hydrogen sulfide gas containing 50 percent by volume of nitrogen. Then 0.1 gram-mole of cesium chloride was supported on the resultant mixture. 10 ml. of this catalyst was mixed with 10 ml. of quartz sand and filled into a reaction tube of heat-resistance glass of 8 mm.

inside diameter. The reaction tube was maintained at 350°C. and a gas mixture consisting of propylene, hydrogen cyanide, oxygen, hydrogen chloride and nitrogen at a volume ratio of 3:1:2:1:3 was introduced at a space velocity of 200 hr$^{-1}$. The yields of methyacrylonitrile and crotononitrile based on the introduced hydrogen cyanide were 36.3 and 54.1 percent respectively, over 2 days after the starting of reaction, and the same yields were maintained over 50 days after the starting of reaction.

COMPARATIVE EXAMPLE 4

0.1 gram-mole of palladium chloride, 0.1 gram-mole of cadmium chloride and 0.2 gram-mole of cesium chloride were supported on 1 l. of silica gel. 10 ml. of this catalyst was mixed with 10 ml. of quartz sand and filled into the same reaction tube as in Example 4. The reaction was carried out in the same manner as in Example 4. The yields of methacrylonitrile and crotononitrile based on the introduced hydrogen cyanide were 38.1 and 52.5 percent respectively, over 2 days after the starting of reaction, and 23.8 and 35.5 percent respectively, over 50 days after the starting of reaction.

EXAMPLE 5

10 ml. of the same catalyst as in Example 4 was mixed with 10 ml. of quartz sand and filled into the same reaction tube as in Example 4. The reaction tube was maintained at 300°C. and a gas mixture consisting of isobutylene, hydrogen cyanide, oxygen, hydrogen chloride and nitrogen at a volume ratio of 3:1:2:2:2 was introduced at a space velocity of 200 hr$^{-1}$. The yield of of beta, beta-dimethylacrylonitrile based on the introduced hydrogen cyanide was 80.3 percent over 5 days after the starting of reaction and about the same yield was maintained over 30 days after the starting of reaction.

COMPARATIVE EXAMPLE 5

Using the same catalyst as in Comparative Example 4, the reaction was carried out in the same manner as in Example 5. The yield of beta, beta-dimethylacrylonitrile based on the introduced hydrogen cyanide was 75.9 percent over 5 days after the starting of reaction and 66.3 percent over 30 days after the starting of reaction.

EXAMPLE 6

0.1 gram-mole of palladium chloride was supported on 1 l. of silica gel, which is referred to as "A". A was reduced with hydrogen at 350°C., which is referred to "B". A was reduced with an aqueous hydrazine-alkaline solution, which is referred to as "C". A, B and C were treated at 350°C. for 20 hours with a hydrogen sulfide gas containing 70 percent by volume, respectively. 0.1 gram-mole of sodium chloride and 0.1 gram-mole of potassium chloride were supported on both B and C. The catalysts of A, B and C thus obtained were filled into the same reaction tube as in Example 5, respectively. Each reaction tube was maintained at 330°C. and a gas mixture consisting of ethylene, hydrogen cyanide, oxygen, hydrogen chloride and nitrogen at a volume ratio of 10:1:2:1:1 was introduced at a space velocity of 150 hr$^{-1}$. The yield of acrylonitrile based on the introduced hydrogen cyanide was 82.1 percent according to the catalyst of A, 79.2 percent according to the catalyst of B and 83.4 percent according to the catalyst of C, over 10 days after the starting of reaction.

EXAMPLE 7

0.1 gram-mole of palladium chloride, 0.1 gram-mole of cadmium chloride and 0.2 gram-mole of cesium chloride were supported on 1 l. of active carbon by the conventional immersion method and the resultant mixture was treated at 450°C. for 15 hours with a hydrogen sulfide gas containing 5 percent by volume of carbon monoxide. 5 ml. of this catalyst was mixed with 5 ml. of quartz sand and filled into a reaction tube of heat-resistance glass of 8 mm. inside diameter. The reaction tube was maintained at 300°C. and a gas mixture consisting of ethylene, hydrogen cyanide, oxygen, hydrogen chloride and nitrogen at a volume ratio of 5:2:1:1:40 was introduced at a space velocity of 600 hr$^{-1}$. The yield of acrylonitrile based on the introduced hydrogen cyanide was 86.5 percent over 12 days after the starting of reaction.

EXAMPLE 8

The same catalyst as in Example 7 was treated at 310°C. for 5 hours with a gas mixture of hydrogen and nitrogen at a volume ratio of 1:1 and furthermore treated at 400°C. for 20 hours with hydrogensulfide gas. 5 ml. of this catalyst was mixed with 5 ml. of quartz sand and filled into a reaction tube of heat-resistance glass of 8 mm. inside diameter. The reaction tube was maintained at 310°C. and a gas mixture consisting of ethylene, hydrogen cyanide, oxygen and nitrogen at a volume ratio of 7:1:2:20 was introduced at a space velocity of 800 hr$^{-1}$. The yield of acrylonitrile based on the introduced hydrogen cyanide was 85.1 percent over 7 days after the starting of reaction.

EXAMPLE 9

0.1 gram-mole of palladium chloride, 0.1 gram-mole of cadmium chloride and 0.1 gram-mole of bismuth chloride were supported on 1 l. of silica gel. The resultant mixture was immersed in a saturated aqueous solution of hydrogen sulfide, filtered off by suction and immersed in the saturated aqueous solution. This procedure was repeated several times and the mixture was thoroughly washed with water and dried by suction. Then 0.1 gram-mole of cesium chloride was supported on the resultant mixture. 5 ml. of this catalyst was mixed with 5 ml. of quartz sand and filled into a reaction tube of heat-resistance glass of 8 mm. inside diameter. The reaction tube was maintained at 300°C. and a gas mixture consisting of ethylene, hydrogen cyanide, oxygen, beta-chloropropionitrile and nitrogen at a volume ratio of 3:1:2:1:13 was introduced at a space velocity of 600 hr$^{-1}$. The yield of acrylonitrile based on the introduced hydrogen cyanide was 82.0 percent over 30 days after the starting of reaction.

EXAMPLE 10

0.1 gram-mole of palladium chloride was supported on 1 l. of silica gel and the resultant mixture was treated at 300°C. for 30 hours with a hydrogen sulfide gas containing 40 percent by volume of nitrogen and 10 percent by volume of hydrogen. Furthermore 0.1 gram-mole of cadmium chloride and 0.2 gram-mole of potassium bromide was supported on the resultant mixture. 15 ml. of this catalyst was filled into a reaction tube of heat-resistance of 10 mm. of inside diameter. The reaction tube was maintained at 330°C. and a gas mixture consisting of propylene, hydrogen cyanide, oxygen, hydrogen chloride and nitrogen at a volume ratio of 7:1:1:2:4 was introduced at a space velocity of 150 hr$^{-1}$. The yields of methacrylonitrile and crotononitrile based on the introduced hydrogen cyanide were 35.5 and 53.4 percent respectively, over 30 days after the starting of reaction.

EXAMPLE 11

An aqueous hydrochloric acid solution containing 0.1 gram-mole of palladium chloride, 0.1 gram-mole of zinc chloride, 0.1 gram-mole of cesium chloride and 0.1 gram-mole of ferric chloride was mixed with 1 l. of an aqueous alumina sol solution containing 10 percent by weight of $Al_2O_3$ and the mixture was evaporated to dryness in a rotary evaporator. The resultant mixture was treated with hydrogen sulfide gas at 800°C. for 5 hours. 5 ml. of this catalyst was mixed with 5 ml. of quartz sand and filled into a reaction tube of heat-resistance glass of 8 mm. inside diameter. The reaction tube was maintained at 310°C. and a gas mixture consisting of ethylene, hydrogen cyanide, oxygen, hydrogen chloride and nitrogen at a volume ratio of 10:2:2:1:35 was introduced at a space velocity of 800 hr$^{-1}$. The yield of acrylonitrile based on the introduced hydrogen cyanide was 84.2 percent over 60 days after the starting of reaction.

EXAMPLE 12

0.1 gram-mole of palladium chloride, 0.1 gram-mole of chloroplatinic acid and 0.1 gram-mole of potassium chloride were supported on 1 l. of active carbon by the conventional immersion method and the resultant mixture was reduced with hydrogen at 350°C. and thereafter treated at 350°C. for 20 hours with a hydrogen sulfide gas containing 90 percent by volume of nitrogen. 15 ml. of this catalyst was mixed with 5 ml. of quartz sand and filled into a reaction tube of heat-resistance glass of 10 mm. inside diameter. The reaction tube was maintained at 360°C. and a gas mixture consisting of propylene, hydrogen cyanide, oxygen, hydrogen chloride and nitrogen at a volume ratio of 5:1:1:1:2 was introduced at a space velocity of 150 hr$^{-1}$. The yields of methacrylonitrile and crotononitrile based on the introduced hydrogen cyanide were 22.3 and 30.5 percent respectively, over 90 days after the starting of reaction.

EXAMPLE 13

0.1 gram-mole of palladium nitrate and 0.1 gram-mole of zinc nitrate were supported on 1 l. of silica gel and the resultant mixture was immersed on a saturated aqueous solution of hydrogen sulfide, filtered off by suction and dried by suction and 0.1 gram-mole of cesium iodide was supported on the resultant mixture. 5 ml. of this catalyst was mixed with 5 ml. of quartz sand and filled into a reaction tube of heat-resistance glass of 8 mm. inside diameter. The reaction tube was maintained at 300°C. and a gas mixture consisting of propylene, hydrogen cyanide, oxygen, hydrogen iodide and nitrogen at a volume ratio of 3:1:1:1:4 was introduced at a space velocity of 100 hr$^{-1}$. The yields of methacrylonitrile and crotoninitrile based on the introduced hydrogen cyanide were 45.0 and 41.5 percent respectively, over 35 days after the starting of reaction.

EXAMPLE 14

0.1 gram-mole of palladium chloride and 0.1 gram-mole of barium chloride were supported on 1 l. of alumina and the resultant mixture was treated with hydrogen sulfide gas at 500°C. for 10 hours. 5 ml. of this catalyst was mixed with 5 ml. of quartz sand and filled into a reaction tube of heat-resistance glass of 8 mm. inside diameter. The reaction tube was maintained at 280°C. and a gas mixture consisting of propylene, hydrogen cyanide, oxygen, nitrogen and hydrogen sulfide at a volume ratio of 7:1:1:1:0.1 was introduced at a space velocity of 500 hr$^{-1}$. The yields of methacrylonitrile and crotononitrile were 27.5 and 41.2 percent respectively, over 10 days after the starting of reaction.

EXAMPLE 15

0.1 gram-mole of palladium chloride, 0.1 gram-mole of thallium chloride and 0.1 gram-mole of potassium cyanide were supported on 1 l. of alumina and the resultant mixture was treated with hydrogen sulfide gas at 350°C. for 20 hours and furthermore 0.1 gram-mole of potassium cyanide was supported on the resultant mixture. 10 ml. of this catalyst was filled into a reaction tube of heat-resistance glass of 8 mm. inside diameter. The reaction tube was maintained at 330°C. and a gas mixture consisting of ethylene, hydrogen cyanide, oxygen, hydrogen chloride and nitrogen at a volume ratio of 1:1:1:1:1 was introduced at a space velocity of 200 hr$^{-1}$. The yield of acrylonitrile based on the introduced hydrogen cyanide was 78.1 percent over 15 days after the starting of reaction.

EXAMPLE 16

0.1 gram-mole of palladium nitrate and 0.1 gram-mole of ammonium vanadate were supported on 1 l. of zinc-alumina-spinel and the resultant mixture was treated at 400°C. for 20 hours with a hydrogen sulfide gas containing 70 percent by volume of nitrogen and thereafter heated at 400°C. for 5 hours in air. 5 ml. of this catalyst was mixed with 5 ml. of quartz sand and filled into a reaction tube of heat-resistance glass of 8 mm. inside diameter. The reaction tube was maintained at 350°C. and a gas mixture consisting of propylene, hydrogen cyanide, oxygen, hydrogen chloride and nitrogen at a volume ratio of 3:1:1:1:4 was introduced at a space velocity of 700 hr$^{-1}$. The yields of methacrylonitrile and crotononitrile based on the introduced hydrogen cyanide were 20.5 and 31.1 percent respectively, over 21 days after the starting of reaction.

EXAMPLE 17

0.1 gram-mole of palladium chloride and 0.1 gram-mole of cadmium chloride were supported on 1 l. of silica gel and the resultant mixture was reduced with an aqueous hydrazine-alkaline solution and furthermore treated at 420°C. for 15 hours with a hydrogen sulfide gas containing 5 percent by volume of nitrogen. 2 ml. of this catalyst was mixed with 2 ml. of quartz sand and filled into a reaction tube of heat-resistance of 6 mm. inside diameter. The reaction tube was maintained at 360°C. and a gas mixture consisting of ethylene, hydrogen cyanide, oxygen, hydrogen chloride and carbon monoxide at a volume ratio of 5:1:1:1:7 was introduced at a space velocity of 100 hr$^{-1}$. The yield of acrylonitrile based on the introduced hydrogen cyanide was 82.3 percent over 90 days after the starting of reaction.

EXAMPLE 18

0.1 gram-mole of palladium chloride and 0.1 gram-mole of cadmium chloride and 0.1 gram-mole of cesium chloride were supported on 1 l. of silica gel and the resultant mixture was treated with hydrogen sulfide gas at 400°C. for 20 hours and furthermore 0.1 gram-mole of cesium chloride was supported on the resultant mixture. 50 ml. of this catalyst was mixed with 50 ml. of quartz sand and filled into a reaction tube of stainless steel of 10 mm. inside diameter. The reaction tube was maintained at 330°C. and the reaction pressure was maintained at 6 Kg./cm.$^2$ and a gas mixture consisting of ethylene, hydrogen cyanide, oxygen, hydrogen chloride and nitrogen at a volume ratio of 5:1:1:1:7 was introduced at a space velocity of 300 hr$^{-1}$. The yield of acrylonitrile based on the introduced hydrogen cyanide was 88.1 percent over 30 days after the starting of reaction.

EXAMPLES 19 to 37

Examples in which there were used catalysts prepared from palladium metal or palladium compounds and other metal compounds, are shown in Table I.

TABLE I

| Example number | Catalyst [1] | | Carrier | Reaction temperature (°C.) | Space velocity (hr.⁻¹) | Composition of a feed gas mixture (volume ratio) | | | | | | Yield of products (percent) [2] |
|---|---|---|---|---|---|---|---|---|---|---|---|---|
| | | | | | | | Hydrogen cyanide | Oxygen | Hydrogen halide | Nitrogen | Others | |
| 19 | Palladium cyanide (0.1) Cadmium chloride (0.1) | $H_2S$ 300 40 | Alumina | 280 | 1,000 | Ethylene, 3 | 1 | 1 | 0 | 45 | 0 | Acrylonitrile, 65.0. |
| 20 | Palladium nitrate (0.1) Silver nitrate (0.1) Potassium hydroxide (0.2) | $H_2S$ 400 20 | Silica gel | 360 | 200 | Propylene, 7 | 1 | 2 | HCl, 2 | 2 | Propane, 1 | Methacrylonitrile, 24.0; crotononitrile, 34.1 |
| 21 | Palladium chloride (0.1) Cupric sulfate (0.05) | $H_2S$ 330 10 | Pumice | 280 | 1,500 | Propylene, 1 | 1 | 1 | 0 | 22 | 0 | Methacrylonitrile, 14.0; crotononitrile, 21.0. |
| 22 | Palladium metal (0.1) Ruthenium chloride (0.01) | $H_2S$ 400 10 | Active carbon | 330 | 1,000 | Ethylene, 5 | 1 | 2 | HCl, 1 | 5 | Carbon dioxide, 1 | Acrylonitrile, 78.0. |
| 23 | Palladium iodide (0.1) Cobalt chloride (0.1) Rubidium chloride (0.1) | $H_2S$ 350 20 | Silica gel | 330 | 250 | Isobutylene, 3 | 1 | 1 | HI, 1 | 1 | Helium, 1 | Beta, beta-dimethylacrylonitrile, 81.2. |
| 24 | Palladium chloride (0.1) Ferric nitrate (0.1) Cadmium sulfide (0.05) | $H_2S$ 400 10 | ----do---- | 330 | 600 | Ethylene, 10 | 1 | 2 | HCl, 1 | 0 | Steam, 1 | Acrylonitrile. |
| 25 | Palladium sulfate (0.1) Manganous chloride (0.1) Potassium thiocyanate (0.2) | $H_2S$ 400 20 | Active carbon | 310 | 150 | Ethylene, 10 | 1 | 1 | 0 | 3 | Propionitrile, 0.1 | Acrylonitrile, 72.0. |
| 26 | Palladium acetate (0.1) Indium chloride (0.1) Potassium bromide (0.2) | $H_2S$ 400 20 | Diatomaceous earth | 360 | 300 | Ethylene, 1 | 2 | 2 | HBr, 1 | 4 | 0 | Acrylonitrile, 44.0. |
| 27 | Palladium iodide (0.05) Stannic oxide (0.05) | $H_2S$ 300 15 | Silica gel | 330 | 1,500 | Propylene, 2 | 2 | 1 | 0 | 45 | Crotononitrile, 0.1 | Methacrylonitrile, 15.1; crotononitrile, 22.2. |
| 28 | Palladium phosphate (0.1) Lead chloride (0.1) | Aqueous $H_2S$ 20 Suction drying | ----do---- | 250 | 1,500 | Ethylene, 5 | 1 | 2 | HCl, 1 | 41 | Acetonitrile, 0.2 | Acrylonitrile, 64.0. |
| 29 | Palladium bromide (0.1) Bithmuth nitrate (0.1) | Aqueous $H_2S$ 20 Suction drying | Active carbon | 330 | 500 | Ethylene, 10 | 1 | 2 | HCl, 2 | 5 | Acrylonitrile, 1 | Acrylonitrile, 82.0. |
| 30 | Palladium chloride (0.1) Ammonium molybdate (0.1) Zinc chloride (0.1) | $H_2S$ 350 20 | Silica-alumina | 280 | 700 | Ethylene, 5 | 2 | 1 | HCl, 1 | 91 | 0 | Acrylonitrile, 67.5. |
| 31 | Tungsten chloride (0.1) Potassium sulfide (0.2) Palladium sulfide (0.2) | $H_2S$ 400 20 | Alumina | 350 | 150 | Ethylene, 7 | 1 | 2 | HBr, 1 | 3 | Methane, 1 | Acrylonitrile, 80.1. |
| 32 | Palladium chloride (0.1) Tellurium chloride (0.1) | $H_2S$ 350 10 | Silica-gel | 250 | 500 | Ethylene, 3 | 1 | 1 | 0 | 5 | 0 | Acrylonitrile, 56.6. |
| 33 | Palladium chloride (0.1) Sodium hydroxide (0.2) Cadmium chloride (0.05) | $H_2S$ 400 5 | ----do---- | 280 | 750 | Normal butylene, 3 | 1 | 1 | HCl, 1 | 34 | 0 | Alpha, beta-dimethyl-acrylonitrile, 15.6; ethylacrylonitrile, 51.1. |
| 34 | Palladium chloride (0.1) Rubidium chloride (0.2) Zinc chloride (0.05) | $H_2S$ 350 10 | Active carbon | 200 | 300 | Vinyl chloride, 2 | 1 | 1 | HCl, 2 | 4 | 0 | Chloroacrylonitrile, 17.0; fumaronitrile, 18.2; acrylonitrile, 14.0 |

TABLE I - Continued

| Example number | Catalyst [1] | Carrier | Reaction temperature (°C) | Space velocity (hr⁻¹) | Composition of a feed gas mixture (volume ratio) | | | | | Yield of products (percent) [2] |
|---|---|---|---|---|---|---|---|---|---|---|
| | | | | | Hydrogen cyanide | Olefin | Oxygen | Hydrogen halide | Nitrogen Others | |
| 35 | {Palladium metal (0.1)<br>Strontium sulfate (0.1)<br>Potassium chloride (0.2)} {H₂S 350 20} | Alumina | 300 | 1,000 | 1 | Propylene, 1 | 2 | HCl, 1 | 5 Crotononitrile, 0.5 | Methacrylonitrile, 18.0; crotononitrile, 27.0 |
| PAT. 4:2672 | | | | | | | | | | |
| 36 | {Palladium chloride (0.1)<br>Potassium chlorate (0.1)<br>Lantanum chloride (0.05)} {H₂S 400 10} | Iron-alumina-spinel | 330 | 300 | 1 | Ethylene, 10 | 2 | HCl, 1 | 1   0 | Acrylonitrile, 72.8 |
| 37 | {Palladium chloride (0.1)<br>Zinc chloride (0.1)} {H₂S 350 15} | Silica gel | 330 | 300 | 1 | Propylene, 2 | 1 | HCl, 1 | 5   0 | Methacrylonitrile, 31.1; crotononitrile, 45.2 |

[1] The figures in (□) represent gram-mole of a catalyst supported on 1 l. of a carrier. The compounds in { } represent the ones treated with hydrogen sulfide. { H₂S 400 20 } represents the treatment of hydrogen sulfide gas at 400°C. for 20 hours.
[2] Yield based on the introduced hydrogen cyanide.

EXAMPLE 38

0.1 gram-mole of palladium chloride, 0.2 gram-mole of cesium chloride and 0.1 gram-mole of cadmium chloride were mixed with 1 l. of an aqueous silica sol solution containing 20% by weight of $SiO_2$ and the mixture was evaporated to dryness in a rotary evaporator. The resultant mixture was treated with hydrogen sulfide at 400°C. for 20 hours. 5 ml. of this catalyst was mixed with 5 ml. of quartz sand and filled into a reaction tube of heat-resistance glass of 8 mm. inside diameter. The reaction tube was maintained at 350°C. and a gas mixture consisting of ethylene, hydrogen cyanide, oxygen, hydrogen chloride nitrogen at a volume ratio of 10:1:2:0.0.:2 was introduced at a space velocity of 150 hr⁻¹. The yield of acrylonitrile based on the introduced hydrogenn cyanide was 80.2 percent over 30 days after the starting of reaction.

EXAMPLE 39

An aqueous hydrochloric acid solution containing 0.05 gram-mole of palladium chloride was mixed with 1 l. of an aqueous alumina sol solution containing 10 percent by weight of $Al_2O_3$ and the mixture was evaporated to dryness on a hot water bath. The resulting mixture was treated with hydrogen sulfide at 850°C for 5 hours. Furthermore 0.1 gram-mole of cesium chloride per 1 l. of alumina sol was supported on the resulting mixture. 20 ml. of this catalyst was mixed with 20 ml. of quartz sand and filled into a reaction tube of stainless steel of 10 mm. inside diameter. The reaction tube was maintained at 330°C. and the reaction pressure was maintained at 4 Kg./cm². and a gas mixture consisting of ethylene, hydrogen cyanide, oxygen, hydrogen chloride and nitrogen at a volume ratio of 50:5:10:3:32 was introduced at a space velocity of 3,000 hr⁻¹. The yield of acrylonitrile based on the introduced hydrogen cyanide was 51.0 percent over 15 days after the starting of reaction.

EXAMPLE 40

An aqeos hydrochloric acid solution containing 0.025 gram-mole of palladium chloride was mixed with 1 l. of an aqueous alumina sol solution containing 10 percent by weight of $Al_2O_3$ and the mixture was evaporated to dryness on a hot water bath. The resultant mixture was treated with a gas mixture consisting of 20 percent by volume of sulfur dioxide and 80 percent by volume of nitrogen at 420°C for 20 hours. Furthermore 0.05 gram-mole of potassium chloride per 1 l. of alumina sol was supported on the resulting mixture. 10 ml. of this catalyst was mixed with 10 ml. of quartz sand and filled into a reaction tube of heat-resistance glass of 8 mm. inside diameter. The reaction tube was maintained at 320°C. and a gas mixture consisting of ethylene, hydrogen cyanide, oxygen, hydrogen chloride and nitrogen at a volume ratio of 50:5:10:5:30 was introduced at a space velocity of 300 hr⁻¹. The yield of acrylonitrile based on the introduced hydrogen cyanide was 84.2 percent over 7 days after the starting of reaction.

What is claimed is:

1. A process for the production of an ethylenically unsaturated aliphatic nitrile, which comprises contacting an olefin selected from the group consisting of ethylene, propylene, normal butylene, isobutylene and vinyl chloride with hydrogen cyanide and a molecular oxygen-containing gas in the gas phase at a temperature of from 100° to 500°C, in the presence of a catalyst obtained by contacting a palladium metal, palladium oxide, palladium hydroxide or palladium salt with a member selected from the group consisting of hydrogen sulfide and sulfur dioxide at a temperature of from −10° to 1,200°C prior to contacting said catalyst with said olefin, said hydrogen cyanide and said molecular oxygen-containing gas.

2. A process according to claim 1 wherein the catalyst is used for treatment with hydrogen sulfide gas at a temperature of 200° to 1,000°C.

3. A process according to claim 1 wherein the catalyst is used after treatment with sulfur dioxide gas at a temperature of 200° to 1,000°C.

4. A process according to claim 1 wherein the catalyst is used after treatment with an aqueous hydrogen sulfide solution at room temperature.

5. A process according to claim 1 wherein the reaction is effected in the presence of a gas selected from the group consisting of helium, nitrogen, carbon dioxide, carbon monoxide, steam, methane, ethane, propane, butane, ethylbenzene and aliphatic nitriles.

6. A process according to claim 1 wherein the olefin is ethylene and the product obtained therefrom is acrylonitrile.

7. A process according to claim 1 wherein the olefin is propylene and the products obtained therefrom are methacaylonitrile and crotononitrile.

8. A process according to claim 1 wherein the olefin is normal butylene and the products obtained therefrom are alpha-ethylacrylonitrile, beta-ethylacrylonitrile and alpha, beta-dimethylacrylonitrile.

9. A process according to claim 1 wherein the olefin is isobutylene and the product obtained therefrom is beta, beta-dimethylacrylonitrile.

10. A process according to claim 1 wherein the olefin is vinyl chloride and the products obtained therefrom are chloroacrylonitrile, fumaronitrile and acrylonitrile.

11. Process as claimed in claim 1 wherein the palladium salt is a member selected from the group consisting of palladium chloride, palladium bromide, palladium iodide, palladium cyanide, palladium thiocyanide, palladium sulfide, palladium sulfate, palladium nitrate, palladium phosphate, palladium hypochlorite, palladium chlorite, palladium chlorate, palladium bromate, palladium iodate, palladium formate, palladium acetate, palladium monochloroacetate and palladium oxalate.

12. Process as claimed in claim 1 wherein said palladium salt is in admixture with another substance and the mixture is selected from the group consisting of palladium chloride and zinc chloride; palladium chloride and cadmium chloride; palladium chloride, chloroplatinic acid and potassium chloride; palladium nitrate and zinc nitrate; palladium chloride and barium chloride; palladium chloride, thallium chloride and potassium cyanide; palladium nitrate and ammonium vanadate; palladium cyanide and cadmium chloride; palladium nitrate, silver nitrate and potassium hydroxide; palladium chloride and cupric sulfate; palladium chloride and ruthenium chloride; palladium iodide, cobalt chloride and rubidium chloride; palladium chloride, ferric nitrate and cadmium sulfide; palladium sulfate, manganous chloride and potassium thiocyanate; palladium acetate, indium chloride and potassium bromide; palladium iodide and stannous oxide; palladium phosphate and lead chloride; palladium bromide and bismuth nitrate; palladium chloride, ammonium molybdate and zinc chloride; tungsten chloride, potassium sulfide and palladium sulfide; palladium chloride and tellurium chloride; palladium chloride, sodium hydroxide and cadmium chloride; palladium chloride, potassium chlorate and lanthanum chloride; palladium chloride, sodium chloride and potassium chloride; palladium chloride, cadmium chloride and cesium chloride; palladium chloride, cadmium chloride and bismuth chloride; palladium chloride, cadmium chloride and potassium bromide; palladium chloride, zinc chloride, cesium chloride and ferric chloride; palladium chloride and cesium chloride; and palladium chloride in combination with potassium chloride.

13. A process according to claim 1 wherein the catalyst comprises palladium metal, strontium sulfate and potassium chloride.

14. A process according to claim 1 wherein the reaction is effected in the presence of a compound selected from the group of hydrogen chloride, hydrogen bromide, hydrogen iodide and halogenated nitrile selected from the group consisting of $\beta$-halogenated propionitrile, $\beta$-halogenated isobutyro nitrile, $\beta$-halogenated butyronitrile, 1-halo-2-cyanobutane, 1-cyano-2-halobutane, 2-halo-3-cyano butane and $\beta$-methyl-$\beta$-halobutyronitrile.

* * * * *